(12) United States Patent
Jensen et al.

(10) Patent No.: US 8,903,924 B2
(45) Date of Patent: Dec. 2, 2014

(54) AGGREGATING DATA IN ELECTRONIC COMMUNICATIONS

(75) Inventors: Peter M. Jensen, Sherwood, OR (US); Arun K. Sar, Santa Clara, CA (US); Cody J. Schaff, Durango, CO (US); Robert L. Welgan, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/316,247

(22) Filed: Dec. 9, 2011

(65) Prior Publication Data

US 2013/0151631 A1 Jun. 13, 2013

(51) Int. Cl.
*G06F 15/16* (2006.01)
(52) U.S. Cl.
USPC .......................................... 709/206; 709/200
(58) Field of Classification Search
CPC .......... H04L 51/18; G06F 17/30; G06F 15/16
USPC .................................................. 709/200, 206
See application file for complete search history.

(56) References Cited

U.S. PATENT DOCUMENTS

| | | | |
|---|---|---|---|
| 8,229,094 B2 * | 7/2012 | Cato | 379/114.01 |
| 2002/0143871 A1 | 10/2002 | Meyer et al. | |
| 2004/0243501 A1 | 12/2004 | Duffey, Jr. | |
| 2005/0228774 A1 | 10/2005 | Ronnewinkel | |
| 2006/0031306 A1 * | 2/2006 | Haverkos | 709/206 |
| 2006/0122899 A1 | 6/2006 | Lee et al. | |
| 2007/0038702 A1 | 2/2007 | Taylor et al. | |
| 2009/0182788 A1 * | 7/2009 | Chung et al. | 707/204 |
| 2010/0306185 A1 | 12/2010 | Smith et al. | |
| 2011/0119593 A1 | 5/2011 | Jacobson et al. | |
| 2011/0196914 A1 * | 8/2011 | Tribbett | 709/203 |
| 2011/0264685 A1 * | 10/2011 | Cheng | 707/769 |
| 2013/0024525 A1 * | 1/2013 | Brady et al. | 709/206 |
| 2013/0024924 A1 * | 1/2013 | Brady et al. | 726/7 |
| 2013/0055105 A1 * | 2/2013 | Spierer | 715/752 |
| 2013/0080539 A1 * | 3/2013 | Jan et al. | 709/206 |
| 2013/0191459 A2 * | 7/2013 | Hedloy | 709/206 |

OTHER PUBLICATIONS

John Roling, Bring Information into Notes with My Widgets, Feb. 25, 2008, 9 pages, Intranet Journal, http://www.intranetjournal.com/articles/200802/pij_02_25_08a.html.
http://code.google.com/p/jaql/, jaql—Query Language for JavaScript(r) Object Notation (JSON), Dec. 2010.

(Continued)

*Primary Examiner* — Anthony Mejia
(74) *Attorney, Agent, or Firm* — Kunzler Law Group; Steven L. Bennett

(57) ABSTRACT

Methods, systems, and computer program products may aggregate data in electronic communications. The method may include detecting, by a computer system, receipt of one or more text-based electronic communications, and identifying, by the computer system, first data of interest with a predetermined characteristic in the text-based electronic communications. The method may additionally include extracting, by the computer system, the identified first data of interest from the text-based electronic communications, and obtaining, by the computer system, an initial first set of associated data that is associated with the extracted first data of interest from at least one electronic resource external to the computer system. The method may further include displaying, by the computer system and independently of the text-based electronic communications and the at least one electronic resource, the extracted first data of interest with the obtained initial first set of associated data.

20 Claims, 4 Drawing Sheets

(56) References Cited

OTHER PUBLICATIONS

Flipboard, Inc., Flipboard is Your Personal Magazine, https://flipboard.com/, 2013.

LogiAnalytics, Business Intelligence Defined, http://www.logianalytics.com/index.php?q=bi-encyclopedia/mashups/, Last retrieved Aug. 25, 2011.

Trackthis—modern package tracking, http://www.usetrackthis.com/, Last retrieved Aug. 25, 2011.

* cited by examiner

AGGREGATING DATA IN ELECTRONIC COMMUNICATIONS

BACKGROUND

The present inventions relate to electronic communications systems, and more specifically, to electronic communications systems that aggregate (or collate) data from electronic communications and other electronic resources.

Electronic communications systems transmit electronic messages, such as email, instant messaging, and text messaging, from senders to recipients. Each electronic message may contain information that may be partly or entirely encoded as text data representing characters. The body of an email message may, for example, be encoded as ASCII text data that can be viewed, printed, searched, saved, and/or otherwise manipulated. This data may contain a sequence of characters of special interest to a recipient. For example, a shipper may send an email message to a customer to report a tracking number that identifies a shipment in transit to that customer. The customer may then use that number to obtain information about the shipment by entering the tracking number into a form on the shipping company's website.

BRIEF SUMMARY

According to one embodiment, a method may include detecting, by a computer system, receipt of one or more text-based electronic communications; and identifying, by the computer system, first data of interest with a predetermined characteristic in the text-based electronic communications. The method may additionally include extracting, by the computer system, the identified first data of interest from the text-based electronic communications; and obtaining, by the computer system, an initial first set of associated data that is associated with the extracted first data of interest from at least one electronic resource external to the computer system. The method may further include displaying, by the computer system and independently of the text-based electronic communications and the at least one electronic resource, the extracted first data of interest with the obtained initial first set of associated data.

According to one embodiment, a computer system may include a processor and a memory. The computer system may additionally include a program comprising a plurality of instructions stored in the memory that are executed by the processor to detect receipt of text-based electronic communications, and identify first data of interest with a predetermined characteristic in the text-based electronic communications. The plurality of instructions additionally comprises instructions that are executed by the processor to extract the identified first data of interest from the text-based electronic communications, and obtain a first set of associated data that is associated with the extracted first data of interest from at least one electronic resource external to the computer system. The plurality of instructions further comprises instructions that are executed by the processor to display, independent of the text-based electronic communications and the at least one electronic resource, the extracted first data of interest with the first set of associated data.

According to one embodiment, a computer program product for aggregating electronic data may include at least one computer readable storage medium having computer readable program instructions embodied therewith. The computer readable program instructions, when read by a processor, configured to receive input from a user regarding a predetermined characteristic of data that the user is interested in, and detect receipt of one or more text-based electronic communications. The computer readable program instructions, when read by a processor, are additionally configured to identify data of interest with the predetermined characteristic in the text-based electronic communications, and extract the identified data of interest from the text-based electronic communications. The computer readable program instructions, when read by a processor, are further configured to obtain an initial set of associated data that is associated with the extracted data of interest from at least one electronic resource external to the computer system, the at least one electronic resource including one or more predetermined resources, and display the extracted data of interest with the obtained initial set of associated data. The computer readable program instructions, when read by a processor, are additionally configured to obtain one or more additional sets of associated data that are associated with the extracted data of interest from the at least one electronic resource external to the computer system, wherein each additional set of data is obtained after a predetermined time period from obtaining the previous set of data until a first completion criterion is met. The computer readable program instructions, when read by a processor, are further configured to display the extracted predetermined data of interest with the obtained one or more additional sets of data independent of the text-based electronic communications and the at least one electronic resource until a second completion criterion is met.

Any of the above embodiments may be embodied as computer-based methods, systems, or program products.

DETAILED DESCRIPTION

Figure 1:
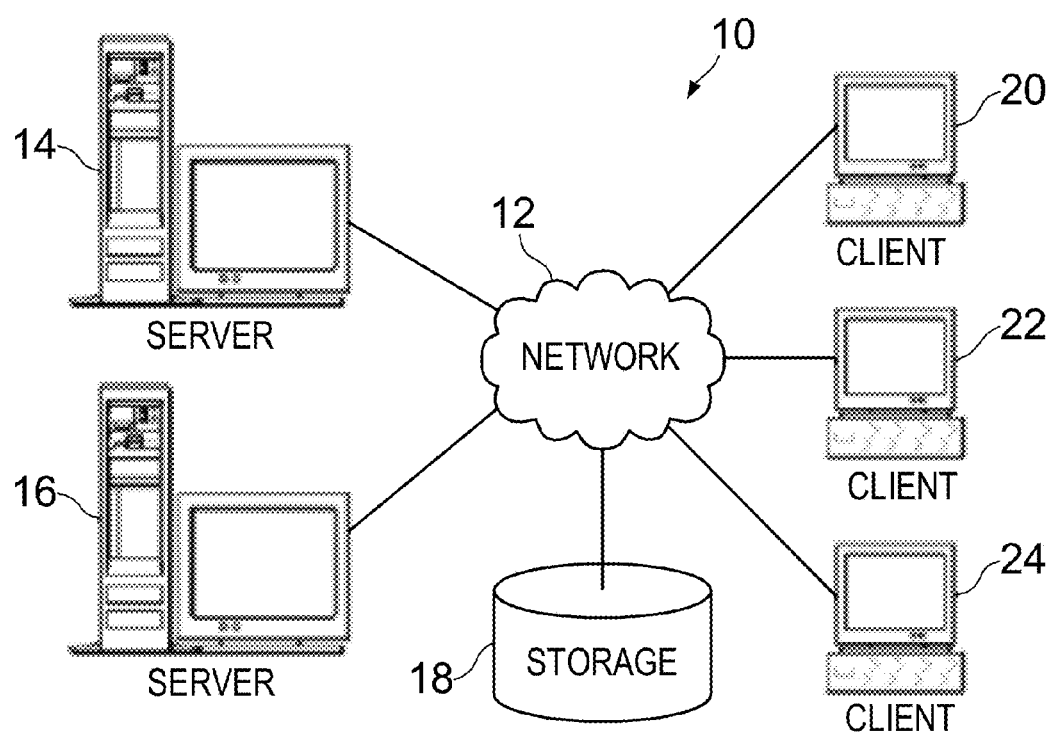
FIG. 1 is a pictorial representation of an example of a computer system in which illustrative embodiments may be implemented.

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 2:
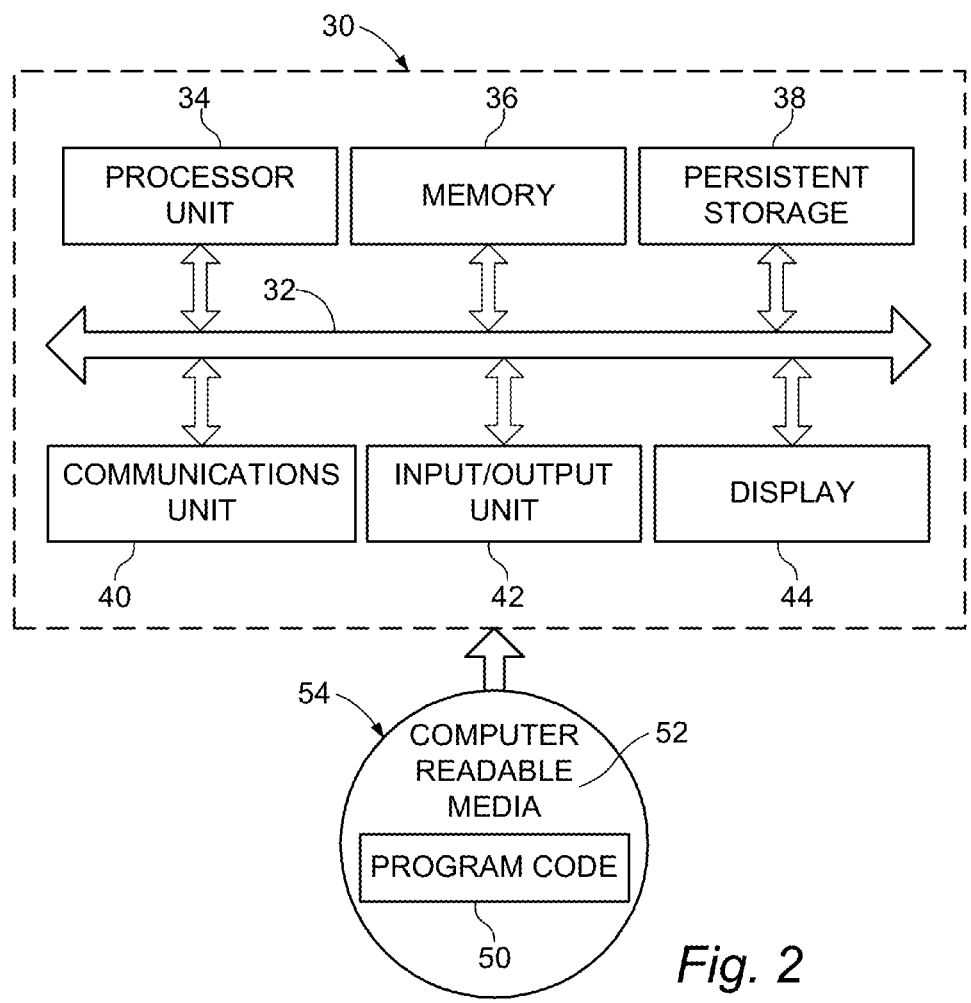
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 depicts a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now also to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information on a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications with either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as, for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code.

The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

Figure 3:
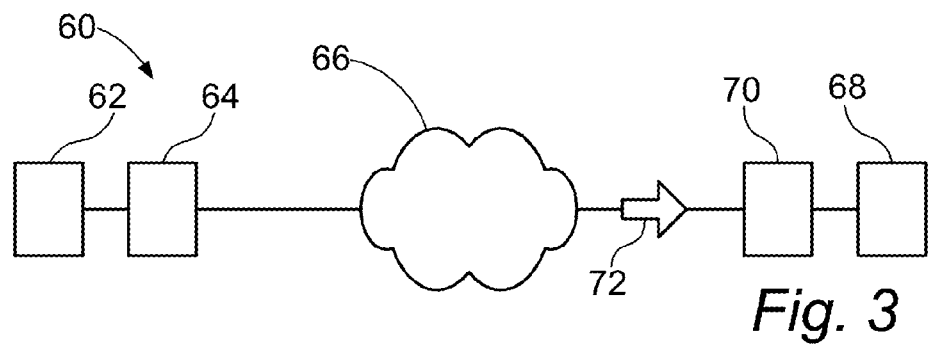
FIG. 3 shows is a block diagram of an example of a communications system in which illustrative embodiments may be implemented.

Referring now also to FIG. 3, a communications system, indicated generally at 60, may be a service or system that can transmit or transfer an electronic communication 72 from one or more senders to one or more recipients. System 60 may include one or more sending devices 62, sending servers 64, communications conductors 66, receiving devices 68, and receiving servers 70. System 60 may be an example of a computer system 10 adapted to transmit, for example, email messages, instant messages, text messages, RSS feeds, and/or similar data. Sending device 62 and receiving device 68 accordingly may be examples of clients 20, 22; sending server 64 and receiving server 70 may be examples of servers 14, 16; and conductor 66 may be an example of network 12.

System 60 may include other, alternative, or additional components, for example, to accommodate various signal-propagation technologies and media.

Sending device 62 may include any suitable structure configured to generate and transmit an electronic communication 72. For example, if system 60 is an email system, then device 62 may be a client computer 20, 22, and/or 24 equipped with email software and directly or indirectly communicating with conductor 66. Device 62 may be operated manually (e.g., by a person writing email) or automatically (e.g., by a computer program generating email). A shipping company, for example, may configure a sending device 62 as an automated device to generate and send email messages containing tracking numbers. A human or automated operator of a sending device may sometimes be referred to as a "sender."

Sending server 64 may include any suitable structure configured to support one or more sending devices 62. For example, in an email system, server 64 may collect, store, forward, and/or otherwise process an outgoing electronic communication 72 sent by device 62 and subsequently relay electronic communication 72 toward a receiving device 68 via conductor 66. Server 64 accordingly may act as a central connection point for one or more devices 62. In some embodiments, the computer system may include one or more intermediate servers that provide shared resources, or may omit servers 64.

Communications conductor 66 may include any suitable signal-carrying service or system that transmits communications 72 from sending device 62 (via server 64, if present) to receiving device 68 (via server 70, if present). For example, conductor 66 may be a network that may include an intranet, the Internet, or both, thereby allowing sending device 62 to pass a communication 72 to receiving device 68. Conductor 66 herein refers to an entire system or mechanism for propagating signals, including not only the medium that carries the signal but also the associated equipment and protocols. If conductor 66 is the Internet, for example, then conductor 66 may include devices implementing DNS, TCP/IP, and/or other underlying protocols. Conductor 66 may be implemented in whole or part through various communications technologies, such as those used for landline, wireless, cellular, or satellite telephone systems; for broadcast, cable, or fiber-optic radio, television, or data transmissions, etc. Conductor 66 may include data-storage technologies and/or may mix multiple communications technologies.

Receiving device 68 may include any suitable structure configured receive an electronic communication 72. For example, if system 60 is an email system, then device 68 may be a computer running email software and directly or indirectly in communication with conductor 66. Device 68 may be operated manually or automatically. Other types of devices 68 may include telephones, cellular telephones, personal digital assistants, smartphones, tablet computers, touch-screen devices, touch-pad devices, etc. Device 68 may be a general-purpose device, such as a computer or a smartphone, or a dedicated device, such as an informational display for pilots, a mobile data terminal for police officers, or an emergency alert system for the public. A human or automated operator of a receiving device 68 may sometimes be referred to as a "recipient."

Receiving server 70 may include any suitable structure configured to support one or more receiving devices 68. In an email system, for example, server 70 may collect, store, relay, and/or otherwise process incoming communications 72 addressed to device 68. Server 70 may act as a connection point and shared resource for one or more devices 68. Communication system 60 may include servers 70 that provide shared resources, or may exclude such servers.

System 60 may be unidirectional or bidirectional. In a unidirectional system, messages flow from sending device 62 to receiving device 68, but device 68 cannot send messages to device 62. In a bidirectional system, device 62 and device 68 may exchange messages in both directions, so that a given device may be a sending device in some contexts or a receiving device in other contexts. Special-purpose information-display systems may be unidirectional, while email systems may be bi-directional.

Figure 4:
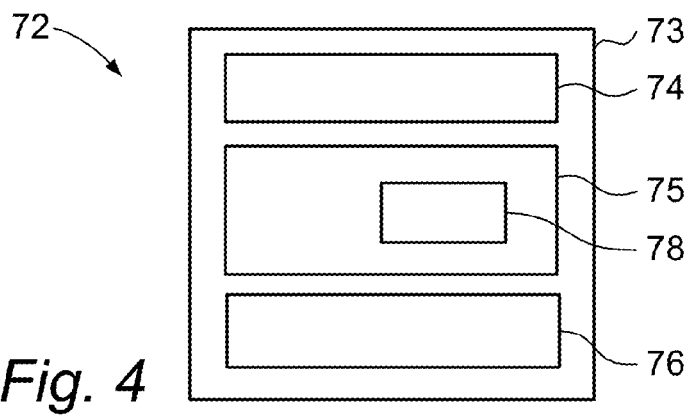
FIG. 4 shows is a block diagram of an example of an electronic communication in accordance with the principles of the present inventions.

Referring also to FIG. 4, electronic communication 72 may be a digital message transmitted from one or more sending devices 62 to one or more receiving devices 68. Electronic communication 72 may include a plurality of sections, such as an envelope-like wrapper 73 containing routing data; a header 74 containing control data identifying the subject, sender, recipient, etc.; a body 75 containing the content of the message; and/or one or more attachments 76 containing additional data, such as image files. Each section may be encoded as text or binary data, alone or in combination. Text data may be encoded in any of several schemes, such as ASCII, Unicode, etc. Data not encoded as text may be processed natively, such as by device 68, and may be convertible to text, for example, by format-exporting software, optical character recognition, or voice-recognition techniques. Data represented as text or convertible to text may be referred to herein as "text-based." Body 75 and/or other sections of communication 72 may contain markup tags, such as those used in HTML, XML, RTF, PDF, PostScript, and other formatting or publishing systems. A "communication" may sometimes be referred to as a "message." Examples of types of messages include email messages, instant messages, text messages, pager messages, RSS feeds, announcements on Twitter and other social media, and so on. FIG. 4 shows an abstraction of a representative message format for email messages as an illustrative example. Email or other types of electronic communications 72 may differ in message format from that shown, for example, by having more or fewer sections, or by arranging data or sections differently.

An electronic communication 72 may additionally contain data of interest 78 (or DOI 78), or data of special interest, to its recipient. The data of interest may occur in multiple instances in multiple communications. For example, an email from a shipping company may contain a tracking number that provides ongoing access to the status of a particular package. The company may send a distinct email containing a unique tracking number for each package passing through its hands—and therefore over time the company may send multiple instances of email that may contain multiple instances of tracking numbers. Due to their ongoing significance independent from the email messages that reported them, these tracking numbers illustrate an example of a DOI 78. Other examples of DOIs may include names, telephone numbers, addresses, zip codes, URLs, email addresses, license plate numbers, driver's license numbers, credit card numbers, social security numbers, product serial numbers, patent numbers, project numbers, bug-tracking numbers, airline flight numbers, ISBN numbers, etc. Any set, selection, and/or sequence of letters, digits, characters, and/or symbols functioning as, for example, a reference, key, index, pointer, and/or identifier may be a DOI 78. The salient characters may be contiguous or discontiguous. A given instance of a DOI (a particular defect number, for instance) may appear in more than one communication, and a given communication 72 may contain more than one DOI (both license plate and driver's license numbers, for instance).

A particular DOI 78 may follow inferable, specified, and/or otherwise known formal pattern (which sometimes may be referred to as a "predetermined characteristic"), so that the DOI may be detectable and identifiable within electronic communication 72, such as by testing potential matches to see if they fit the pattern. For example, a DOI might be known to start with a constant letter, followed by any letter, followed by any digit, etc. Only matches that conform to that pattern may be instances of that DOI. For example, a shipping company's tracking numbers might be inferred to always start with a letter, followed by a letter, followed by a dash, followed by a digit, etc., up to some predictable total number of characters. Each tracking number may be unique, but all follow the same format. For another example, credit card numbers observe a specified 16-digit format that can be parsed from the surrounding text and tested for conformity to a specification. Such features and/or attributes, which abstract a pattern that identifies a type of DOI, may be called "characteristics." Aggregator 80 may implement rules for identifying one or more specific types of DOI 78 by testing for the characteristics of each type of DOI, for example, by means of regular expressions, string functions, filters, and/or other pattern-matching techniques. A particular characteristic of a DOI may have meaning apart from its role as a portion of an identifying code, such as a product serial number. Certain characters of a serial number, for example, may identify a production run, a facility, a date, and/or the like in addition to serving as a portion of an identifier of a single example of the product.

A DOI 78 may be a portion and/or part of electronic communication 72 selected as an important and/or useful part of such communication. DOI 78 may be located in any section of electronic communication 72 (such as its wrapper 73, header 74, body 75, and/or attachments 76). Portions of a DOI 78 may occur in more than one section. For example, a DOI 78 may be a sequence of one or more letters and digits in body 75 of an electronic communication 72; and/or the DOI may include, in addition to the letters and digits, other salient characteristics, such as a sending address read from header 74.

Figure 5:
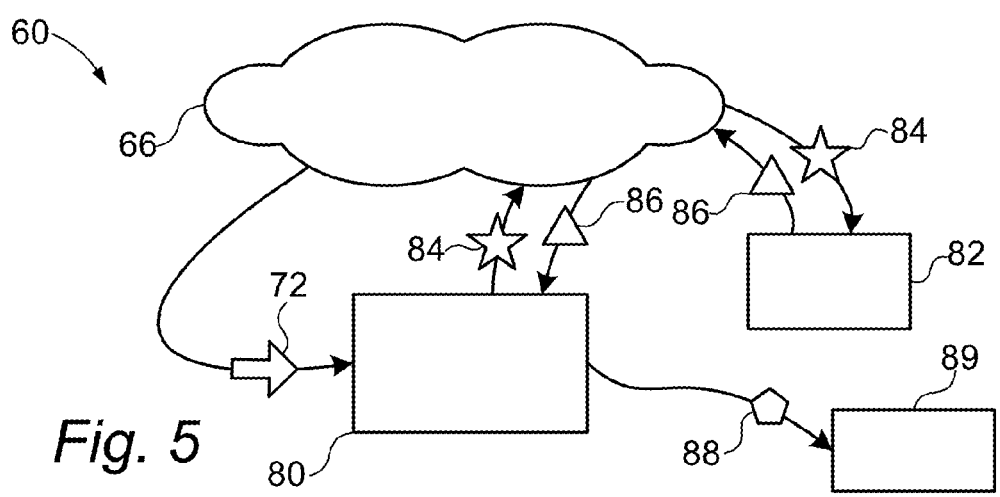
FIG. 5 shows a partial view of the communications system of FIG. 3 in which illustrative embodiments may be implemented.

Referring also to FIG. 5, aggregator 80 may include any suitable structure configured to detect one or more electronic communications 72, identify one or more DOIs within detected communications 72, and/or extract identified DOIs from electronic communications 72. Aggregator 80 may additionally, or alternatively, obtain associated data 86 that is associated with one or more extracted DOIs from one or more resources 82, and/or display result data 88 (which may include identified DOIs 78 and associated data 86) on a display device 89. Aggregator 80 may perform additional and/or alternative operations, and/or may omit listed operations. Aggregator 80 may perform any or all communications steps, such as receiving communications 72, querying resource 82, receiving associated data 86, and sending result data 88 to display device 89 via conductor 66.

For example, aggregator 80 may be a computer system 60 or portion of computer system 60. Alternatively, or additionally, aggregator 80 (or portions of aggregator 80) may be an example of a server 14, 16. Aggregator 80 (or portions of aggregator 80) may reside anywhere within system 60. For example, in an embodiment, a computer functioning as a sending server 64 and/or a receiving server 70 may also function as aggregator 80, allowing aggregator 80 to efficiently monitor incoming and/or outgoing communications 72 processed by server 64 or 70. In an embodiment, aggregator 80 (or portions of aggregator 80) may be implemented as one or more programs running on the same hardware as an email server program; and/or aggregator 80 (or portions of aggregator 80) may be integrated into the email server software itself. In an embodiment, aggregator 80 (or portions of aggregator 80) may run on receiving device 68. If device 68 is a smartphone, for example, then all or part of aggregator 80 may be implemented as an application executing on the smartphone and/or as an extension of an application executing on the smartphone. A portion of aggregator 80 may, for example, be integrated into an email client program.

For brevity, this application often discusses aggregator 80 in the context of receiving communications 72. The same principles apply to sending communications. For example, an organization sending messages may wish to monitor outgoing message traffic to identify, extract, and summarize known DOIs. In an embodiment, all or part of aggregator 80 may reside on a sending device, sending server, and/or elsewhere in a sending system.

An electronic resource 82 is a source that includes additional information associated with DOI 78, such as a website, database, and/or other library or repository of data. Resource 82 may be publically or privately accessible via system 60, for example via the Internet. Resource 82 may be a third-party facility, publication, and/or service. An illustrative example of a resource 82 is a website maintained by a shipping company that, given an identification number (such as a tracking number), returns a generated webpage showing the current status (or status information) of the shipment identified by that tracking number. Another illustrative example of a resource 82 is an automobile-registration database that, given a license plate number, returns the model, year, color, VIN number, owner, and/or other details about a given car. Because ownership data of this sort is often kept secret, a registration database of this sort may require access through a secured network or other private channel.

A query 84 is a communication or request sent by aggregator 80 to one or more resources 82 to obtain data associated with one or more DOIs. Query 84 may be sent to resource 82 via conductor 66. Query 84 may list, designate, and/or refer to instances of one or more extracted DOIs and may include statements that select the information to be obtained. If resource 82 is a MySQL database, for example, then query 82 may contain SQL statements to specify an instance of a DOI and to specify the data pertaining to that DOI to be retrieved from the database.

To support the submission of queries 84, aggregator 80 may implement rules that define, for example, a method for sending a query 84 to a specific resource 82. These rules may record, for example, the location of resource 82, a means of accessing resource 82, a means of submitting a query 84 to resource 82, and so on. For example, if resource 82 is a website that provides a form that has a field for entering an instance of a DOI, then aggregator 80 may implement a rule that automates the process of accessing the website via its URL, inserting an instance of a DOI into the form field, submitting the request to the website, and receiving the web page sent back in response.

Submitting queries 84 may be an iterative process. If aggregator 80 maintains a list of multiple instances of a DOI, for example, then aggregator 80 may combine instances into one query, thereby obtaining a result for multiple instances in one step. Aggregator 80 may construct and submit a distinct query 84 for each member of a list of instances, thereby obtaining a result for each listed instance via a series of queries. Aggregator 80 may submit multiple queries to different resources seeking data about the same instance of a DOI, for example, so that aggregator 80 may consolidate data about a DOI obtained from more than one source.

Associated data 86 may be a specified portion of a product returned by a resource 82 in response to a query 84. For example, if a resource 82 returns as its product a webpage containing status data pertaining to a queried instance of a DOI, then associated data 86 is the status data associated with that DOI, which may be separated from the web page from which the associated data 86 came from. Aggregator 80 accordingly may implement a means for filtering out unwanted portions of the product returned by a resource. This filtering or processing operation may exploit strategies similar to those used to detect a DOI in a communication. For example, a product returned as an HTML document may be a text file containing content and markup. Processing this document may involve identifying patterns in the content, markup, or both, for example, via regular expressions or string functions. After locating and extracting the associated data 86 from the returned product, aggregator 80 may prepare result data 88 and pass data 88 to a display device 89. Aggregator 80 may store the associated data 86, for example, to consolidate associated data 88 in order to construct a list, table, and/or other aggregated result 88. Continuing the shipping-company example, the rule that process the returned HTML page may extract and store the shipping date, estimated arrival date, current location, and/or other status reported by the shipper.

A rule for processing returned products may accommodate special cases or error conditions. For example, a query to a shipper might yield an error message reporting that the DOI was not found, a notice that a parcel may be lost, and/or some other exception. A rule may detect and handle errors and exceptions, for example, by creating a list of exceptions and separately displaying or reporting them.

Result data 88 may be information about one or more DOIs sent from aggregator 80 to display device 89. Result data 88 may include an extracted instance of a DOI and/or associated data 86 obtained for that DOI. Continuing the shipping-company example, if the extracted DOI is a single tracking number, then result data 88 may comprise that particular tracking number combined with all or part of the status information associated with that tracking number. If aggregator 80 has extracted multiple instances of a particular type of DOI, then result data 88 may comprise a series of instances of that DOI, each with its corresponding associated data 86. For instance (continuing the shipping-company example) if aggregator 80 is maintaining a list of extracted tracking numbers, then result data 88 may include multiple tracking numbers and information about each tracking number. Result data 88 of this sort may represent a summary of a given type of information automatically gleaned from a stream of electronic communications 72 and augmented with associated data 86 obtained from external resources 82.

Aggregator 80 may consolidate data from multiple DOIs into one set of result data 88. Aggregator 80 may consolidate associated data 86 from multiple resources into one set of result data, for example to combine data about a given DOI taken from more than one source into one report.

Result data 88 may include statements specifying the display format used for the result data 88. For example, if result data 88 consolidates information about multiple instances of a DOI, then result data 88 may include statements interpreted by display device 89 as instructions to display the extracted DOI and associated data 86 in a specified structure or arrangement. For example, result data 88 may include markup to define a tabular display format, where each row may list a particular tracking number followed by a status report obtained from the shipper's website. Statements specifying a display format may, for example, add labels or other text, control typesetting, draw graphics, include images, etc. The result data may be displayed independent of the electronic communications and/or electronic resources.

Aggregator 80 may update the associated data 86, the displayed result data 88, or both. The trigger for performing an update may be, for example, an event generated or handled by aggregator 80. For example, the triggering event may derive from an internal or external condition or measured value, which may therefore trigger an update as an irregular, asynchronous, and/or conditional event. The trigger may be an update request issued by the user, for example via an interface of aggregator 80. The trigger may be a predetermined time, and aggregator 80 may provide a feature to allow a user to specify or change that time. The trigger may be a predefined time interval yielding a regular series of updates, and aggregator 80 may provide a feature to allow a user to specify or change a time interval for updates. By providing updates, aggregator 80 accordingly may provide an ongoing, automated report of current or recent result data 88 relating to a category of information expressed as one or more DOIs—considerably simplifying the task of obtaining the same result data by manual inquiry.

A display device 89 may be any apparatus or system that can show or store result data 88. For example, a display device 89 may be a standard display, such as a monitor to provide an on-screen display, or a printer to provide a hardcopy display. A display device 89 may be a storage device, such as a hard drive. For instance, aggregator 80 may write result data 88 to one or more files on a hard drive, for example, to preserve the result data 88 for later use, additional processing, and/or subsequent viewing on a monitor or via a printer. Display device 89 may be a dedicated or special-purpose device, such as an informational kiosk, braille terminal, or speech synthesizer, etc.

Figure 6:
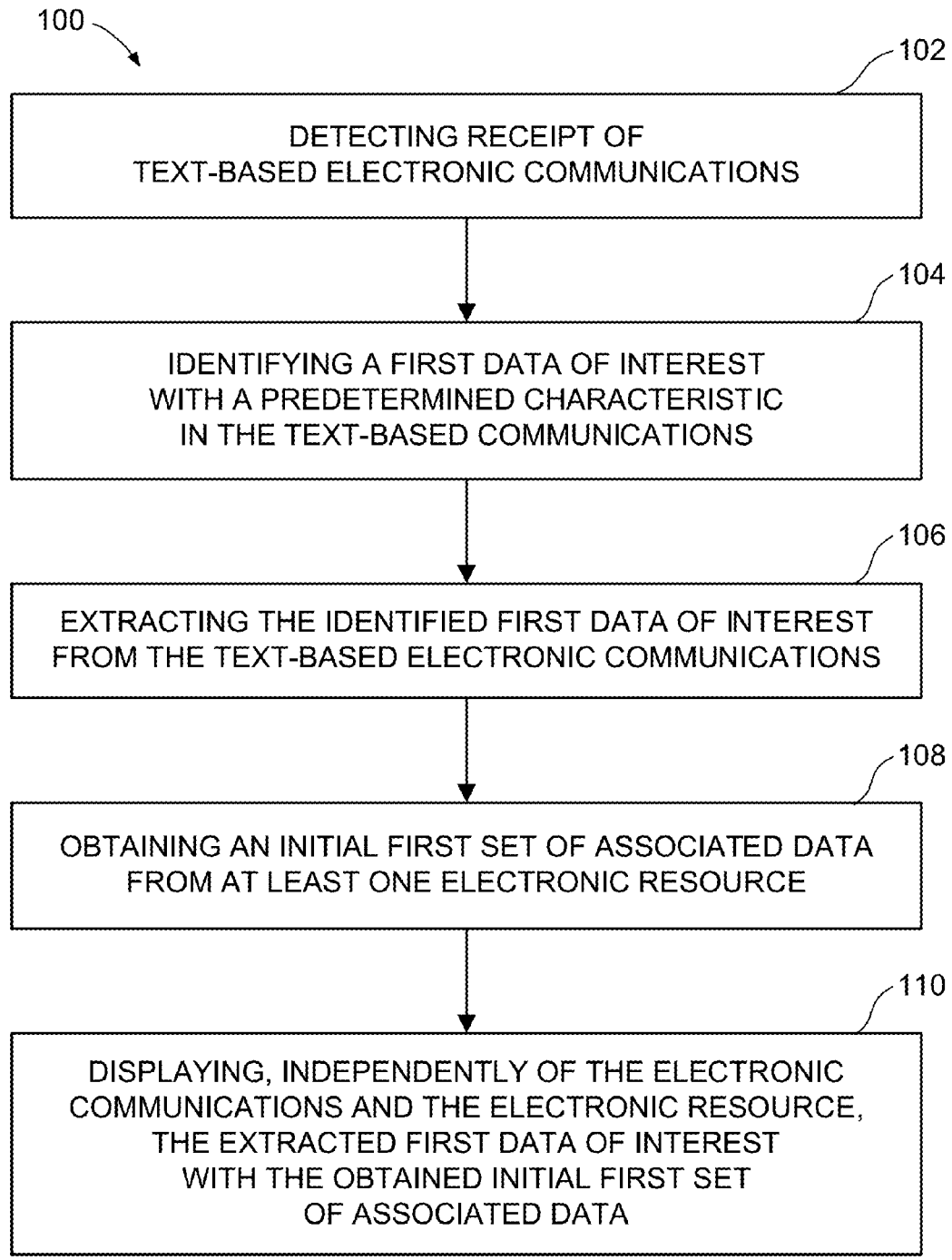
FIG. 6 shows an example of a method of aggregating electronic data in accordance with the principles of the present inventions.

Referring now also to FIG. 6, a method 100 of aggregating data is shown. The method may include detecting 102 the receipt of text-based electronic communications; identifying 104 data of interest (DOI) with a predetermined characteristic in communications; extracting 106 the identified DOI from communications; obtaining 108 an initial set of associated data from at least one electronic resource; and (independent from the communications and resources) displaying 110 the extracted DOI with the obtained initial set of associated data. Method 100 may further include determining if an additional set of data associated with the extracted DOI is available and, if available, obtaining the additional associated data. Method 100 may further include obtaining additional sets of associated data from at least one electronic resource until one or more completion criteria are met. Method 100 may include other, alternative, or additional elements (or steps); may omit one or more elements; and/or may follow a different sequence of elements from that listed.

Method 100 or any element of method 100 may receive one or more parameters that enable or disable options or otherwise modify the operation of method 100 or elements 102, 104, 106, 108, and/or 110. For example, aggregator 80 may offer an interface that allows the user to select options that enable or disable identifying 104 for certain categories of messages.

Detecting 102 may include monitoring an incoming (and/or outgoing) stream of message traffic while waiting for the receipt of text-based electronic communications. Detecting 102 may concurrently monitor the stream for multiple types of text-based electronic communications such as email, instant messages, pager messages, text messages, etc. In an embodiment, detecting 102 may pass all received text-based electronic communications for further processing, for example, by identifying 104. In an embodiment, detecting 102 may apply rules or criteria to received text-based communications to select some communications for further processing and/or to exclude some communications from further processing. In an embodiment, detecting 102 may select or exclude received electronic communications using predetermined message types as criteria, passing electronic communications of one or more types for further processing and/or ignoring messages of one or more types. This selection and/or exclusion limits the electronic communications being passed to, for instance, identifying 104 to be scanned for the presence of one or more DOIs, to one or more enabled types. For example, detecting 102 may be configured to limit detection to email messages, or to both email and text messages; or to exclude pager messages; and so on in any combination of types.

In an embodiment, detecting 102 may receive input from an administrator or other user, for instance, to enable or disable the types of electronic communications being monitored, thereby limiting subsequent processing to one or more selected types. For example, aggregator 80 may allow a user to select one or more types from a list of types, such as emails, text messages, etc. For another example, aggregator 80 may allow a user to directly specify one or more types, for instance, by allowing the user to input text or wildcard sequences indicating the type. In an embodiment, aggregator 80 may offer features to limit the detection of electronic communications by other criteria, such as sending address, receiving address, subject, etc. Any message attribute may be used as a criterion enabling or disabling further processing of particular communications or categories of communications. Only communications that fit the enabled criteria may trigger, for instance, a scan by identifying 104. Limiting the messages to be scanned may, for example, improve efficiency, accuracy, and/or privacy.

Identifying 104 may include scanning a detected communication or associated data while applying a pattern-matching rule or operation defined according to the characteristics of a particular selected DOI. A pattern-matching rule may be implemented using, for example, regular expressions, string functions, templates, filtering, and/or other methods for testing for the presence or absence of a pattern in text. Identifying 104 may include additional processing, such as validating a possible DOI against a formal specification of its characteristics. For example, if electronic communication 72 or associated data 86 contains an instance of the DOI (a "hit"), then identifying 104 may pass the identified instance of the DOI directly or indirectly to extracting 106. Additionally, if the electronic communication or associated data 86 does not contain the DOI and a second or subsequent DOI is selected, identifying 104 may test the communication or data for the second and/or subsequent DOI—that, if present, may be passed to extracting 106. When identifying 104 finishes testing the electronic communication or associated data for the last enabled DOI, it may advance to a second communication (if one has been detected) or second set of associated data (if present) and test that second communication or data for each specified DOI. Identifying 104 may continue iteratively until it reaches the last selected DOI in the last detected communication or data. Method 100 may then return to detecting 102 and wait for the receipt of a new communication.

In an embodiment, identifying 102 may receive input from a user. For example, aggregator 80 accordingly may offer a feature to allow the selection of one or more DOIs to be identified and extracted from detected electronic communications 72. For example, aggregator 80 may offer one or more predefined DOIs, each with an associated label, and a feature to allow the user to select one or more DOIs from a labeled list. For example, aggregator 80 may offer a DOI to detect a first shipping company's tracking numbers, another DOI to detect a second shipping company's tracking numbers, and another to detect a third shipping company's tracking numbers. In this example, aggregator 80 may also offer an associated check-box interface that allows a user to select any combination of the three predefined DOIs, for example, in order to monitor specified communications for tracking numbers from multiple vendors at the same time.

In an embodiment, aggregator 80 may offer features that allow a user to enter a literal sequence of characters as a DOI for exact-match identification. In an embodiment, aggregator 80 may allow a user to enter a wildcard sequence of characters as a DOI via a specified syntax. For each character position, for example, a user may be able to specify "any letter," "any digit," and/or other designations defined in the syntax, permitting identification by pattern matching. This option may allow a user to create a DOI outside the predefined list.

Extracting 106 may include copying the value of the identified instance of a DOI from the electronic communication or associated data containing it. In an embodiment, extracting 106 may pass the extracted instance directly or indirectly to obtaining 108. In an embodiment, extracting 106 may include alternative or additional processing, such as adding the extracted instance to a list of one or more instances of that DOI by type. By maintaining one or more lists of DOIs, extracting 106 may keep a record of each detected instance, potentially simplifying subsequent or iterative operations. Maintaining those lists (or other lists) may benefit from occasional housekeeping operations, for example, to prune outdated entries from a list. In an embodiment, extracting 106 may receive input from a user, for example, via options selected from an interface of aggregator 80.

Obtaining 108 may include one or more methods for requesting or retrieving data about one or more extracted DOIs from one or more electronic resources. A request may take the form of, for example, sending a query to an electronic resource to retrieve data describing one or more identified instances of a DOI. The query may list, designate, and/or refer to instances of one or more extracted DOIs and may include statements that select the information to be obtained. Obtaining 108 accordingly may implement rules that define, for example, methods for generating a query and methods for sending it to a predetermined or specified electronic resource.

The electronic resource may respond to a request, such as query, by returning a product, such as a webpage, containing information sought by the query. This product may also contain irrelevant or unwanted information, such as HTML markup defining the structure and appearance of a webpage product. Obtaining 108 accordingly may implement rules that define, for example, methods for receiving, processing, and/or interpreting the product returned from the electronic resource. Obtaining 108 may include rules for parsing and/or filtering the returned product to extract selected portions of it. If the electronic resource returns an HTML page, for example, then obtaining 108 may extract particular portions of the page as associated data for the queried DOI. Continuing the shipping-company example, the tracking-database website may return a generated HTML page detailing the status a particular tracking number. The webpage may contain content and markup irrelevant to DOI. Consequently, obtaining 108 may extract specified data items, such as estimated delivery date, and ignore other content, such as the shipper's phone number. The pattern-matching techniques described for extracting an instance of a DOI from a detected communication may also apply to extracting the relevant portions of the returned product. Obtaining 108 may use, for example, regular expressions, string functions, and/or the like to identify and extract relevant results. A resource may provide an API or other programmatic support to expedite the task of identifying and extracting relevant results. The extracted portions of the returned product pertinent to the queried DOI may be associated data associated with the queried DOI.

In an embodiment, the electronic resource may be a predetermined resource associated with, for example, a given DOI. For example, if extracting 106 extracts phone numbers and obtaining 108 uses an online phone directory to obtain an associated name and address, then obtaining 108 may incorporate rules defining the location of the directory and a method of accessing it as a predetermined resource. The electronic resource may be external to, for example, the aggregator and/or computer system.

The associated data may itself contain one or more DOIs. For example, a set of associated data retrieved for a DOI extracted from a communication (a first DOI) may contain or cross-reference additional DOIs (second DOIs) of the same type, different types, or mixed types. Continuing the shipping-company example, a query for a particular tracking number (a first DOI) may retrieve a status report (first associated data) that contains or refers to additional tracking numbers (second DOIs). A shipment of 100 parcels, for instance, may be assigned a set of 100 distinct tracking numbers, one for each parcel. A query for any one tracking number in the shipment may retrieve a status report that cross-references one or more tracking numbers assigned to other parcels in the shipment. In this example, a single query thus may yield up to 99 additional tracking numbers (second DOIs), each with its own status report (second associated data).

In an embodiment, obtaining 108 may directly or indirectly identify and extract one or more second DOIs from the first associated data. For example, obtaining 108 may treat associated data as if it were a text-based electronic communication, passing the associated data to identifying 104 as a means of identifying and extracting a second DOI. Obtaining 108 may then obtain a set of associated data for one or more extracted second DOIs. This second set of associated data may itself contain or reference further additional DOIs. The process accordingly may continue iteratively or recursively until obtaining 108 either reaches a predefined or specified limit or reaches the last additional DOI in the expanding set of additional second DOIs. Obtaining 108 may maintain a separate list of all members of a set of related or associated additional DOIs, for example, to pass the list to displaying 110 to generate a distinct report for the set.

Obtaining 108 may receive input from a user. For example, in an embodiment, aggregator 80 may provide a list of electronic resources 82 and an interface for selecting resources from the list. Aggregator 80 may provide a feature to allow the user to directly enter a new resource, for example, to accommodate changes to a URL that may happen from time to time. Obtaining 108 may be a single operation (obtaining an initial set for one instance of an extracted DOI) or an iterative operation (obtaining an initial set for multiple instances of an extracted DOI, for example as a kind of batch operation that traverses a list of extracted instances).

Displaying 110 an extracted DOI with the obtained set of associated data may include transmitting the extracted DOI and/or associated data (referred to as "result data") to a display device, such as display device 89. Displaying result data 88 may take the form of sending an ongoing or intermittent stream of result data 88 to a display device 89. Displaying result data 88 may take the form of generating a report in a designated format, for example, to create a persistent record of result data 88. Displaying result data 88 may take the form of sending a communication to a designated person, group, or device. For example, aggregator 80 may generate result data in the form of an email message and send the message to a designated address. Displaying 110 may occur independently from the electronic communications that contained or implied the DOIs being displayed and/or independently from the electronic resources that returned the associated data being displayed. The display of result data accordingly is distinct from the sources of information that identify, generate, and/or contribute to the result data being displayed.

During obtaining 108, aggregator 80 may query a resource 82 for multiple instances of a DOI, for example, by iterating through a list of instances of a given type. Aggregator 80 may query more than one resource for associated data 86 about the same instance of a DOI. Aggregator 80 may consolidate the retrieved data for each instance into a combined or aggregated set of result data 88. Aggregator 80 may further consolidate associated data from more than one resource into a combined or aggregated set of result data 88. Display 110 may consequently display a set of result data 88 summarizing the status of all instances of that DOI from all available sources of associated data.

In an embodiment, displaying 110 may present result data 88 in a specified display format. For example, a display format may be a tabular format, with each row or column displaying an extracted instance of a specified DOI followed by the associated data obtained from the electronic resource. Aggregator 80 may offer one or more features to allow the user to control the display format, for example, by enabling or disabling the display of particular columns that present a specific item of the associated data 86 for each instance of a DOI. For example, in a tabular display of motor-vehicle data that potentially includes columns for model, year, and VIN, aggregator 80 may allow the user to enable or disable the display of any combination of columns.

Displaying 110 may generate result data in a specified document format. Examples of document formats may include HTML or XML formats, word processor document formats, spreadsheet formats, email message formats, and tab- or comma-delimited text, to name a few. Displaying 100 may receive user input to control the document format. For example, aggregator 80 may offer one or more features to allow the user to select a document format from a list of formats. Aggregator 80 may further allow the user to control the location of a generated document, for example, by selecting a path defining the location of a file to be saved on a storage device. By displaying result data, possibly in the form of a persistent report saved to a file, aggregator 80 may obtain and integrate additional data about one or more DOIs; automate the process of obtaining and updating that data; and/or consolidate data about multiple DOIs extracted from multiple messages in one place. Furthermore, the displayed result may be used outside the communication client and/or independent from the external data resource, and may allow for persistent access to the consolidated information by the user.

For example, if the selected communications are "all emails received by members of a designated workgroup" and the selected DOI is "all tracking numbers used by a particular shipper," then the result data may summarize the current status of all shipments identified by tracking number in all email messages sent to members of the workgroup. In this example, the result data may contain data that is not present in the underlying messages, such as updated estimates of delivery dates obtained from an external website. The result data may eliminate the time spent repeatedly looking up the status of each shipment, provide an ongoing overview of shipments by category, and create an efficient tool for managing shipments.

In an embodiment, aggregator 80 may query resource 82 to obtain an initial set of associated data 86 describing an instance of a DOI. In an embodiment, aggregator 80 may again obtain one or more additional sets of associated data 86, for example, to refresh associated data 86 with updated values. Continuing the shipping-company example, aggregator 80 may extract a new tracking number from an email and send a query to the shipper's website to obtain an initial set of associated data (status information for the shipment identified by that tracking number, for example). Aggregator 80 may subsequently query the shipper's website for the same tracking number to obtain an additional set of associated data (updated status information). In an embodiment, an initial set of associated data 86 may be obtained a first time and one or more additional sets of associated data may be obtained at least a second time that is after the first time, thereby updating the associated data 86, displayed result data 88, or both as an ongoing, continuous, repeated, and/or iterative task. Continuing the example, after obtaining an initial set tracking data, aggregator 80 may obtain updated tracking status multiple times, and may continue to update the status indefinitely.

In an embodiment, aggregator 80 may send queries 84 regarding a particular instance of a DOI to more than one resource 82, for example to consolidate information from multiple sources in one report. In an embodiment, aggregator 80 may provide features for designating one or more recipients of a report. The recipient or recipients of a report may differ from the recipient or recipients of the underlying communications 72. For example, a recipient of report may be a manager or administrator who has the authority to oversee a workgroup and who has an interest in monitoring an event, activity, or the like identifiable by a DOI.

Aggregator 80 may generate a report in a delivery format appropriate to its purpose and audience and may provide features for selecting the format and organizing its contents. The format of a report may be, for example, an XML or HTML page written to a public or private location; a message sent to a designated address, for example, by email; a file stored in an accessible location; an announcement via social media; or a formatted document sent to a printer, to name a few examples. The delivery format of a report may be designed for a specific device and may include codes or markup interpreted by that device. For example, if a report is sent to an informational device, such as an airport kiosk summarizing flight data, then aggregator 80 may generate and deliver report in a format defined by the designers of the kiosk.

In an embodiment, displaying 110 may include displaying an extracted first DOI, the obtained first set of associated data, an obtained second DOI, and the obtained second set of associated data. A first DOI extracted from a communication may yield associated data that contains or references additional instances of the same DOI and/or instances of other DOIs. These second DOIs extracted from the first associated data may yield additional associated data relating to the second DOIs. Continuing the shipping-company example, a status report obtained for a tracking number may cross-reference additional tracking numbers that may be identified and extracted from the status report as second DOIs. Displaying 110 accordingly may generate a set of result data that aggregates the first DOIs, the first associated data, the second DOIs and the second associated data. For example, if a shipment split into multiple parcels has multiple tracking numbers, one for each parcel, then displaying 110 may generate a report summarizing the entire shipment, including not only the original first DOI and its associated status data but also one or more derived second DOIs and their associated status data.

In an embodiment, method 100 may further include determining if an additional first set of associated data is available at an electronic resource—and, if an additional first set is available, obtaining the additional first set. For example, if transmitting the associated data from resource 82 to aggregator 80 is a time-consuming process, then it may be efficient to determine if the associated data on resource 82 has changed and obtain it only if it has changed.

Determining if an additional set of associated data is available may be performed at predetermined time period after, for example, displaying an extracted DOI and its associated data. The display event that initiates the time period may be independent from the communications and resources that were sources of the information being displayed. The time period may serve to, for example, update the result data at a specified interval. The time period may be measured from the display of the initial set of associated data or from a subsequent display of additional associated data. For example, aggregator 80 may provide a feature to allow a user to specify a time period and to receive the user input, for example, to allow a user to specify an update interval. At each specified time period, aggregator 80 may obtain associated data for a DOI from resource 82 to determine if a new, additional, or changed set of associated data 86 is available at a resource 82. As an example of an update method, at each time period, aggregator 80 may resubmit a new query 84 to resource 82 for each extracted DOI present on a list of extracted DOIs and then compile and display (or report) the updated result data obtained from resource 82 for each instance of the DOI on the list.

In an embodiment, method 100 may further include obtaining one or more additional sets of associated data from at least one electronic resource until one or more completion criteria is met. A completion criterion may generally define a stopping point for the process of detecting communications and ultimately displaying result data. Method 100 may define multiple completion criteria and may define logical or conditional rules for applying the criteria. For example, method 100 may associate one or more completion criteria with a DOI. Continuing the shipping-company example, aggregator 80 may build a list of tracking numbers extracted from the shipper's emails. When aggregator 80 identifies a new instance of a tracking number, aggregator 80 may add the new number to the list. In this example, a completion criterion may be an instruction to delete tracking numbers from the list if the associated status indicates successful delivery. This completion criterion automates the maintenance of the list by pruning out-of-date entries. Configured this way, aggregator 80 may operate indefinitely and provide a regular, ongoing report of tracking status at a predetermined interval.

In an embodiment, method 100 may associate one or more completion criteria with an entire process of detecting text-based communications, identifying and extracting instances of one or more DOIs, obtaining sets of associated data, and displaying result data. This sequence of steps may be viewed as a whole as a kind of iterative batch process or task. A completion criterion may be, for example, a termination or expiration date for a task. Configured this way, aggregator 80 may perform the task up to the specified completion criterion (a deadline date, say) and then discontinue the task. For example, aggregator 80 may offer a feature to allow a user to specify a task-level completion criterion and to receive this input from the user.

In an embodiment, method 100 may receive input from the user, for example to enable completion criteria. For example, aggregator 80 may provide an interface feature to allow a user to select one or more completion criteria from a list of predefined criteria. In an embodiment, aggregator 80 may provide a means such as wildcard syntax to allow users to input completion criteria that are outside the list of predefined options.

The terminology used herein is for the purpose of describing particular embodiments only and is not intended to be limiting of the described inventions. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present inventions has been presented for purposes of illustration and description, but is not intended to be exhaustive or limited to the inventions in the form disclosed. For example, the invention may be embodied in an environment that is not part of a revision control system. Many modifications and variations will be apparent to those of ordinary skill in the art without departing from the scope and spirit of the inventions. The embodiments were chosen and described in order to best explain the principles of the inventions and the practical application, and to enable others of ordinary skill in the art to understand the inventions for various embodiments with various modifications as are suited to the particular use contemplated.

What is claimed is:

1. A method, comprising:
    detecting, by a computer system, receipt of one or more text-based electronic communications;
    identifying, by the computer system and in the one or more text-based electronic communications, first data of interest, the first data of interest comprising a predetermined characteristic, the computer system associated with sending the one or more text-based electronic communications;
    extracting, by the computer system, a plurality of instances of the identified first data of interest from a plurality of the text-based electronic communications sent to a plurality of recipients, wherein each text-based electronic communication includes first data of interest with a common predetermined characteristic, and wherein each text-based electronic communication includes first data or interest differing from first data of interest of other text-based electronic communications;
    obtaining, by the computer system and for each identified first data of interest, an initial first set of associated data that is associated with the extracted first data of interest, each initial first set of associated data from at least one electronic resource; and
    displaying, by the computer system and independently of the text-based electronic communications and the at least one electronic resource, a plurality of instances of the extracted first data of interest, each instance of the extracted first data of interest displayed with the corresponding obtained initial first set of associated data.

2. The method of claim 1, wherein obtaining, by the computer system and for each identified first data of interest, an initial first set of associated data that is associated with the extracted first data of interest from at least one electronic resource includes obtaining, by the computer system and from at least one electronic resource external to the computer system, an initial first set of associated data that is associated with the extracted first data of interest, second data of interest that comprises the common predetermined characteristic, and a second set of associated data that is associated with the second data of interest.

3. The method of claim 2, wherein displaying, by the computer system and independently of the text-based electronic communications and the at least one electronic resource, a plurality of instances of the extracted first data of interest with the obtained initial first set of associated data includes displaying, by the computer system and independently of the text-based electronic communications and the at least one electronic resource, the extracted first data of interest, the obtained initial first set of associated data, the obtained second data of interest, and the obtained second set of associated data.

4. The method of claim 1, wherein
    identifying, by the computer system and in the text-based electronic communications, first data of interest with the predetermined characteristic in the text-based electronic communications includes identifying, by the computer system and in the text-based electronic communications, first and second data of interest with the predetermined characteristic in first and second text-based electronic communications of the text-based electronic communications, respectively, each of the first and second text-based electronic communications sent to a different intended recipient; and
    extracting, by the computer system, the identified first data of interest from the text-based electronic communications includes extracting, by the computer system, the identified first and second data of interest from the first and second text-based electronic communications, respectively.

5. The method of claim 4, wherein
    obtaining, by the computer system and for each identified first data of interest, an initial first set of associated data that is associated with the extracted first data of interest from at least one electronic resource includes obtaining, by the computer system and for each identified first data of interest, first and second initial sets of associated data that are associated with the first and second extracted data of interest, respectively, from at least one electronic resource external to the computer system; and
    displaying, by the computer system and independently of the text-based electronic communications and the at least one electronic resource, a plurality of instances of the extracted first data of interest with the obtained initial first set of associated data includes displaying, by the computer system and independently of the first and second text-based electronic communications and the at least one electronic resource, the first extracted data of interest with the obtained first initial sets of associated data and the second extracted data of interest with the obtained second initial set of associated data.

6. The method of claim 1, further comprising determining, by the computer system, if an additional first set of associated data that is associated with the extracted first data of interest is available, and, if available, obtaining, by the computer, the additional first set of associated data.

7. The method of claim 6, wherein determining, by the computer system, if an additional first set of associated data that is associated with the extracted first data of interest is available is performed after a predetermined time period after displaying, by the computer system and independently of the text-based electronic communications and the at least one electronic resource, the extracted first data of interest with the obtained initial first set of associated data.

8. The method of claim 7, further comprising receiving, by the computer system, input from a user specifying the predetermined time period.

9. The method of claim 1, further comprising obtaining, by the computer system, one or more additional first sets of associated data associated with the extracted first data of interest from at least one electronic resource external to the computer system until a user defined completion criterion is met.

10. The method of claim 1, wherein the first data of interest is extracted from a body of the text-based electronic communication, the body of the text-based electronic communication visible to the intended recipient upon opening of the text-based electronic communication.

11. The method of claim 1, wherein the one or more text-based electronic communications are limited to one or more predetermined types of text-based electronic communications.

12. The method of claim 1, wherein the display of the plurality of the plurality of instances of the extracted first data of interest and corresponding initial first sets of associated data is available to the user and not available to the intended recipients of the text-based electronic communications.

13. The method of claim 1, further comprising:
receiving, by the computer system, a notification of an update to the initial set of associated data and obtaining, in response to receiving the notification, an additional set of associated data related to the first data of interest in response to receiving the update; and
displaying the additional set of associated data in place of the initial set of associated data.

14. The method of claim 13, wherein the computer system stores the plurality of instances of the identified first data of interest together in a data structure.

15. A computer system, comprising:
a processor;
a memory; and
a program comprising a plurality of instructions stored in the memory that are executed by the processor to:
detect receipt of text-based electronic communications;
identify first data of interest with a predetermined characteristic in the text-based electronic communications;
extract, from a plurality of text-based electronic communications, a plurality of instances of the identified first data of interest from the text-based electronic communications, at least two of the text-based electronic communications sent to different intended recipients, wherein each text-based electronic communication includes first data of interest with a common predetermined characteristic, and wherein each text-based electronic communication includes first data or interest differing from first data of interest of other text-based electronic communications, the computer system associated with sending the one or more text-based electronic communications;
obtain, for each identified first data of interest, a first set of associated data that is associated with the extracted first data of interest, each initial first set of associated data from at least one electronic resource; and
display, independent of the text-based electronic communications and the at least one electronic resource, a plurality of instances of the extracted first data of interest, each instance of the extracted first data of interest displayed with the corresponding first set of associated data.

16. The computer system of claim 15, wherein the plurality of instructions further comprises instructions that are executed by the processor to obtain, from at least one electronic resource, a first set of associated data that is associated with the extracted first data of interest, second data of interest comprises the common predetermined characteristic, and a second set of associated data that is associated with the second data of interest, and to display, independent of the text-based electronic communications and the at least one electronic resource, the extracted first data of interest, the obtained first set of associated data, the obtained second data of interest, and the obtained second set of associated data.

17. The computer system of claim 15, wherein the plurality of instructions further comprises instructions that are executed by the processor to:
identify first and second data of interest with at least one predetermined characteristic in first and second text-based electronic communications of the text-based electronic communications, respectively, the first and second text-based electronic communications sent to different intended recipients, and extract the identified first and second data of interest from the first and second text-based electronic communications, respectively;
obtain first and second sets of associated data that are associated with the first and second extracted data of interest, respectively, from at least one electronic resource; and
display, independent of the first and second text-based electronic communications and the at least one electronic resource, the first and second extracted data of interest with the obtained first and second sets of associated data.

18. The computer system of claim 17, wherein the plurality of instructions further comprises instructions that are executed by the processor to store the plurality of instances of the identified first data of interest together in a data structure.

19. A computer program product for aggregating electronic data, the computer program product comprising at least one non-transitory computer readable storage medium having computer readable program instructions embodied therewith, the computer readable program instructions, when read by a processor, being configured to:
receive input from a user regarding a predetermined characteristic of data that the user is interested in;
detect receipt of a plurality of text-based electronic communications, each of the text-based electronic communications send to a different intended recipient;
identify, in the plurality of text-based electronic communications, at least one instance of data of interest, each instance of the data of interest comprising the predetermined characteristic, each text-based electronic communication comprising data or interest differing from data of interest of other text-based electronic communications, the identification by a computer system associated with sending the one or more text-based electronic communications;

extract, from the plurality of text-based electronic communications, a plurality of instances of the identified data of interest from the text-based electronic communications;

obtain, for each instance of extracted data of interest, an initial set of associated data that is associated with the extracted data of interest from at least one electronic resource, the at least one electronic resource including one or more predetermined resources;

display a plurality of instances of the extracted data of interest, each displayed data of interest displayed with a corresponding obtained initial set of associated data;

for at least one extracted data of interest, obtain one or more additional sets of associated data that are associated with the extracted data of interest from the at least one electronic resource, wherein each additional set of data is one or more of:
  obtained after a predetermined time period from obtaining the previous set of data until a first completion criterion is met; and
  obtained after receiving a notification of an update to the previous set of data; and display the extracted predetermined data of interest with the obtained one or more additional sets of data independent of the text-based electronic communications and the at least one electronic resource until a second completion criterion is met.

20. The computer program product of claim 19, wherein the computer readable program instructions, when read by a processor, are further configured to receive input from a user specifying at least one of the predetermined time period, the first completion criterion, the second completion criterion, and the one or more predetermined resources.

* * * * *